Oct. 28, 1969  J. D. MOELLER ET AL  3,474,707
VEHICLE ELEVATION CONTROL SYSTEM
Filed June 21, 1967

JOHN D. MOELLER
ROBERT L. HARTWIG
INVENTORS

BY H. M. Saragovitz
E. J. Kelly & H. Berl
ATTORNEYS
J. B. McGuire
AGENT

United States Patent Office
3,474,707
Patented Oct. 28, 1969

3,474,707
VEHICLE ELEVATION CONTROL SYSTEM
John D. Moeller and Robert L. Hartwig, Kalamazoo, Mich., assignors, by mesne assignments, to the United States of America as represented by the Secretary of the Army
Filed June 21, 1967, Ser. No. 648,545
Int. Cl. F15b 9/10, 11/08; F16h 29/20
U.S. Cl. 91—380                    5 Claims

ABSTRACT OF THE DISCLOSURE

A vehicle elevation control device in which a vehicle roadarm is rotated about an axis by an hydraulic system utilizing an axially movable piston having internal and external helical splines and a feed back means for stopping the rotation of the vehicle roadarm when the silhouette of the vehicle reaches the desired height.

---

This invention may be used by or for the Government of the United States of America without the payment to me of any royalty thereon or therefor.

The present invention relates in general to vehicle elevation control system and more particularly to a means for rotating a vehicle roadarm about an axis so that a roadwheel may be changed in elevation relative to the vehicle silhouette, thereby raising or lowering the vehicle body relative to the ground.

In the operation of military vehicles it is often desirable to change the elevaton of the vehicle body relative to the surface of the ground, so as to improve visibility, improve ground traversing ability, etc.

It has been found that the most satisfactory method of accomplishing this is to mount a roadwheel on a roadarm which revolves about an axis on the vehicle so that when the roadarm is rotated the wheel is moved in a circular arc about its axis to a new, fixed position. Thus, the height of the body can be determined by rotating the roadarm to a predetermined angle relative to the earth's surface and the horizontal plane of the body.

It is therefore an object of the present invention to provide a means for rotating a vehicle roadarm so as to provide a means for easily changing the vehicle elevation relative to the earth's surface.

It is also an object of this invention to provide a mechanical-hydraulic vehicle elevation control means which may easily be operated by a vehicle operator without leaving the operator's control compartment or seat.

It is a further object of the present invention to disclose and provide a relatively simple vehicle elevation control means which is inexpensive to manufacture and which may be easily assembled or repaired by personnel in the field.

It is also an object of the present invention to provide a vehicle elevation control device which a vehicle operator may set to elevate the vehicle to a predetermined height and in which a feedback mechanism causes a cessation of operation of the elevation control mechanism when the vehicle is elevated to the predetermined height.

Other objects of the invention will become obvious to those skilled in the art upon perusal of the following description.

Figures 1, 2:
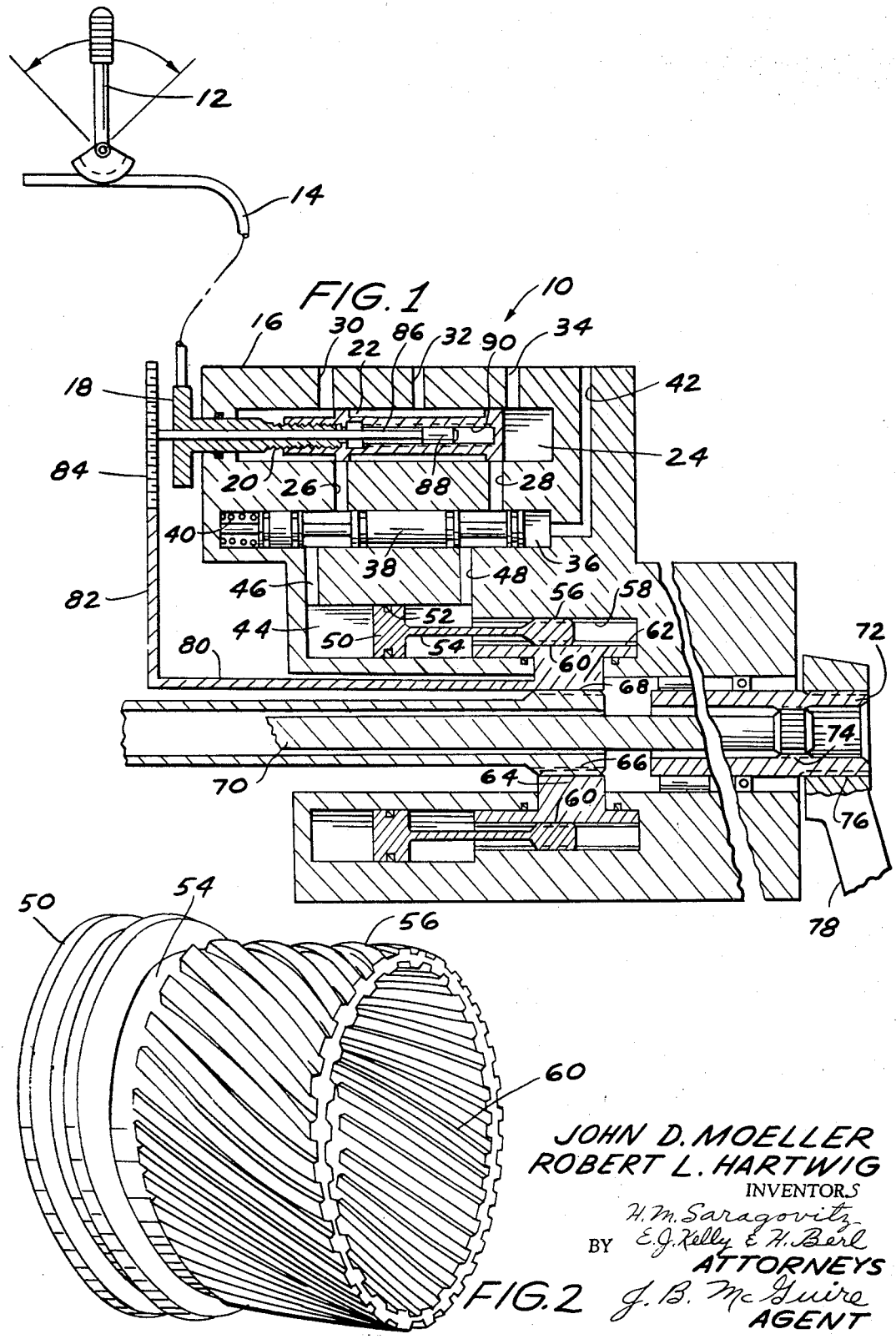
FIGURE 1 shows a sectional view of the vehicle elevation control system, viewed along a horizontal plane from the front of the vehicle.
FIGURE 2 shows a perspective view of a cylindrical piston having internal and external splines thereon, and which is acted upon by fluid under pressure to revolve the vehicle roadarm about its axis of rotation.

Referring more specifically to FIGURE 1, a vehicle elevation controls system 10 is shown which is controlled by a vehicle operator who moves a lever 12 which is attached to a cable 14, actuating a control valve 16 by means of pulley 18. The pulley 18 has a stem 20 with a threaded portion thereon which mates with a threaded portion of valve spool 22.

First fluid chamber 24 has fluid passage ways 26 and 28 connecting it to a second fluid chamber 36. It also has fluid passage ways 30, 32, and 34 connecting it to a reservoir and pumping system. Fluid chamber 36 contains a pressure failure lockout valve means 38 and spring 40 which act as a safety means to shut off the hydraulic system upon loss of fluid pressure. The pressure failure lockout valve is known in the art and forms no part of the instant invention.

A fluid passage 42 extends from fluid chamber 26 to the reservoir and pumping system. A third chamber 44 is connected to the hydraulic system by means of fluid passage ways 46 and 48. Situated in fluid chamber 44 is a cylindrical piston or actuator 50 having piston rings thereon such as at 52. Piston 50 has integrally formed thereon a piston body 54 which ends in a splined portion comprising external helical splines 56 and internal helical splines 60 as shown clearly in FIGURE 2. External helical splines 56 mate with splines 58 on valve body 16 and internal helical splines 60 mate with splines 62 on a gear 64 mounted for rotation within the valve body. Gear 64 also has manufactured thereon splines 66 which mate with splines 68 on a torsion bar 70. Torsion bar 70, in turn, co-acts with a spindle 72 to which it is splined as at 74. Spindle 72 co-acts to rotate a vehicle roadarm 78 by means of splines such as at 76.

Also mounted on gear 64 is a tubular portion 80, only one side of which is shown for simplicity. Extending radially from tubular portion 80 is an extension 82 having external teeth thereon which mesh with a feedback gear 84. Feedback gear has a stem portion 86 ending in a splined section 88 which cooperates with splines 90 on valve spool 22.

OPERATION

In operation, movement of the control lever 12 will cause the cable 14 to rotate pulley 18 and the stem 20 formed thereon. This rotary motion of the stem 20 is translated into linear motion of the spool 22. Movement of the spool 22 to the left will open passageway 26 to a pressure port 32 and vent passage 28 to the reservoir. Fluid under pressure is ported through passageway 26 into chamber 44 and reacts against actuator 50 causing the actuator to move in an axial direction to the right. Linear movement of the actuator 50 will rotate gear 64 through splines 60 and 62, formed on the actuator 50 and on the gear 64 respectively. Rotation of gear 64 will rotate the torsion bar 70 causing the roadarm to move responsive to the direction of the rotation of the torsion bar.

In the operation of the feedback system, rotation of gear 64 imparts rotary motion to gear 84 through the engagement of the teeth on flange 82 of gear 64 and the teeth of gear 84. Rotation of gear 84 rotates splines 88 and 90 and thus spool 22, such that the spool will travel in an axial direction to the right along with integral stem 20 thereby closing passageway 26 to the pressure inlet 32 and closing passageway 28 to the reservoir. This returns the system to the inactive position to await a new input from the control lever 12.

We claim:
1. A vehicle elevation control system comprising a housing supported on a vehicle, a torsion bar rotatably supported within said housing, a roadarm secured to one end of said torsion bar, a rotatable gear disposed within said housing and secured to the other end of said torsion bar, means for suppylying hydraulic fluid under pressure to said housing, valve means, including a spool member, located within said housing for controlling the flow of said hydraulic fluid, means connected to said rotatable gear member and to said spool member for controlling the position of said spool member, piston means, including a sleeve member having formed thereon, interior and exterior splines actuated by said hydraulic fluid and located within said housing for actuating said rotatable gear and hence said torsion bar and said roadarm.

2. A system of claim 1 wherein a rotatable member transmits a force to said valve spool and moves the same axially thereby, regulating the flow of pressurized fluid to said piston means.

3. The apparatus of system of claim 1 wherein a feedback means is provided to move said spool member axially in a direction so as to stop the flow of fluid to said piston means upon movement of said piston means a predetermined distance.

4. The apparatus of claim 3 wherein said feedback means is actuated by a rotatable means which is rotated by the axial movement of said piston means.

5. The apparatus of claim 1 wherein said rotatable gear has mounted thereon an arm carrying a second gear for providing a rotational force to said spool member to cause said spool to stop the flow of fluid to said piston means when said rotatable gear member and thus said vehicle roadarm, have been rotatated a predetermined distance.

References Cited

UNITED STATES PATENTS

| | | | |
|---|---|---|---|
| 3,371,940 | 3/1968 | Sinclair et al. | 180—9.2 |
| 786,652 | 4/1905 | Larson | 91—380 |
| 3,310,284 | 3/1967 | Inaba et al. | 91—380 |
| 3,329,069 | 7/1967 | Feroy | 92—33 |

PAUL E. MASLOUSKY, Primary Examiner

U.S. Cl. X.R.

74—89.15; 91—445, 447; 180—9.2